(No Model.) 2 Sheets—Sheet 1.

J. DAVIS.
FILTER.

No. 402,661. Patented May 7, 1889.

Witnesses

Inventor
John Davis
By Johnston,
Rundel + Dyre
Attorneys (No Model.) 2 Sheets—Sheet 2.
J. DAVIS.
FILTER.
No. 402,661. Patented May 7, 1889.
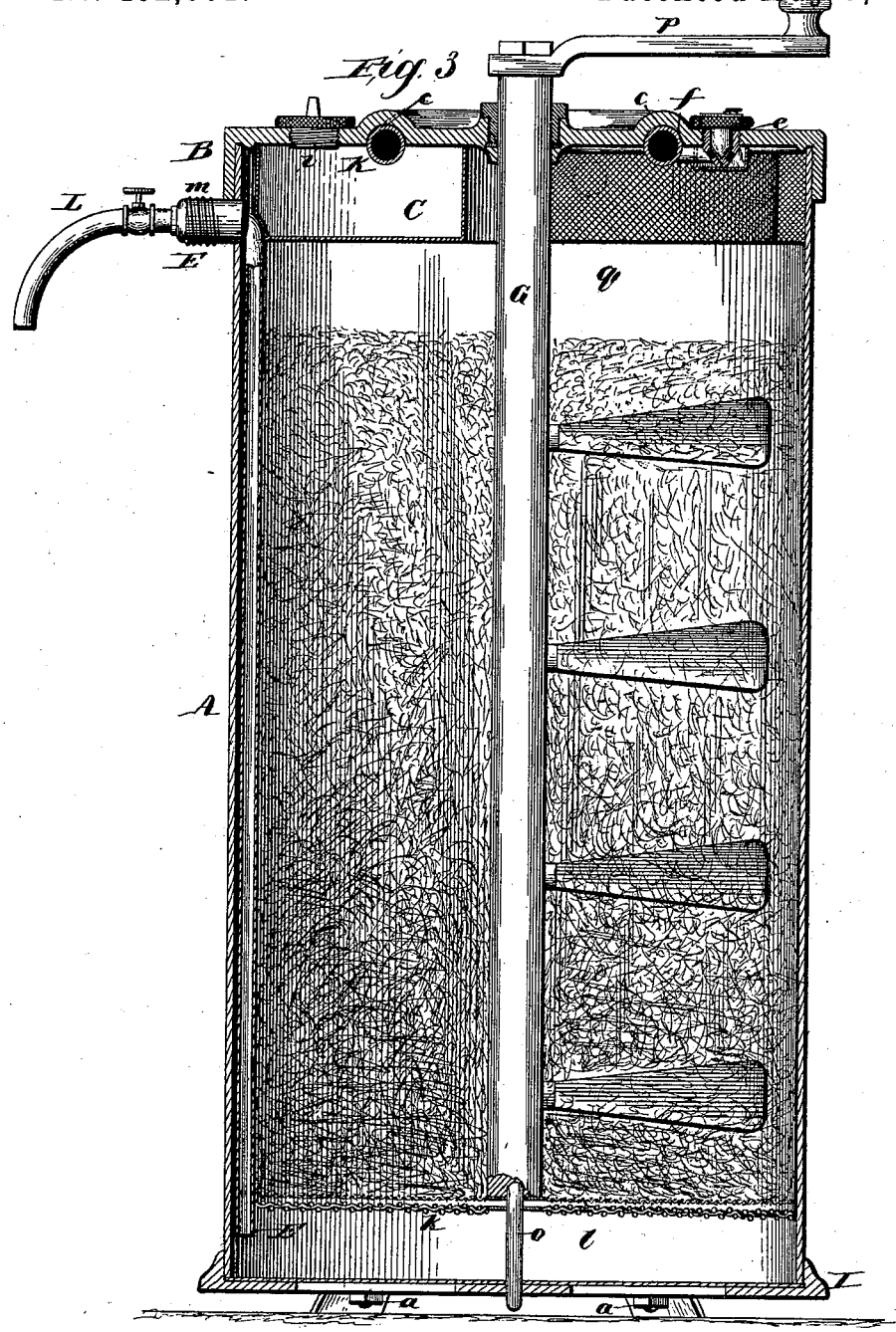
Witnesses
Wm H Scott
M Howard
Inventor
John Davis
By Johnston, Rindell & Dyer
Attorneys

UNITED STATES PATENT OFFICE.

JOHN DAVIS, OF ALLEGHENY, PENNSYLVANIA.

FILTER.

SPECIFICATION forming part of Letters Patent No. 402,661, dated May 7, 1889.

Application filed November 20, 1888. Serial No. 291,378. (No model.)

*To all whom it may concern:*

Be it known that I, JOHN DAVIS, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My invention relates to filters for liquids, and has for its object an improvement in the construction of that class of filters which are provided with a chamber for supplying a coagulant to the water.

The invention will be hereinafter described, and particularly pointed out in the claims.

Figure 1:
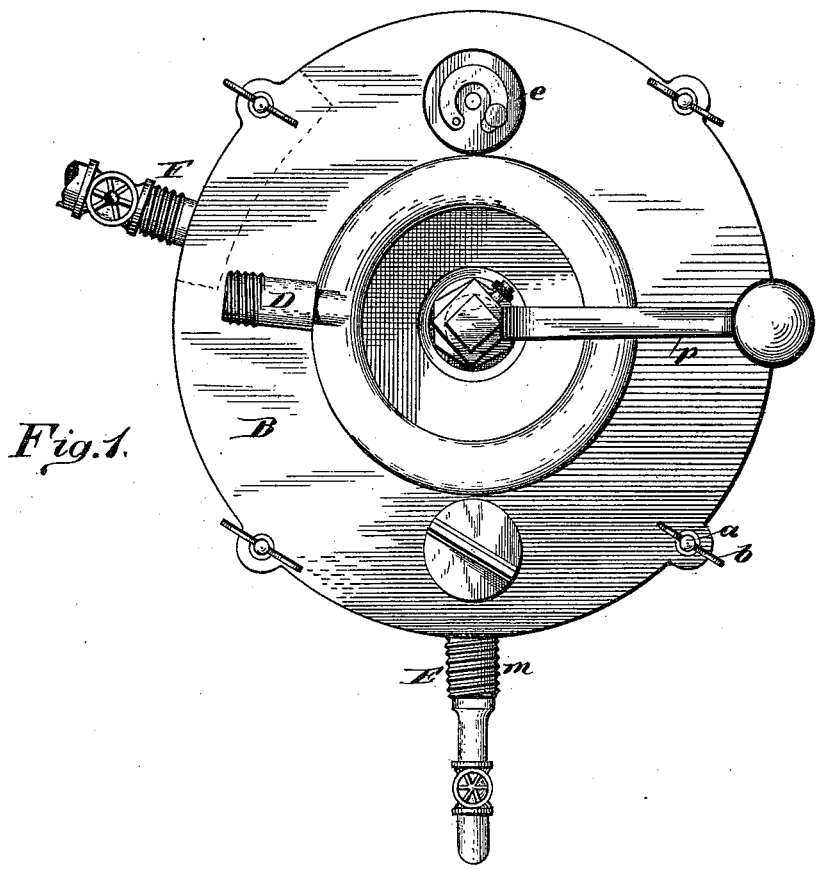
Figure 2:
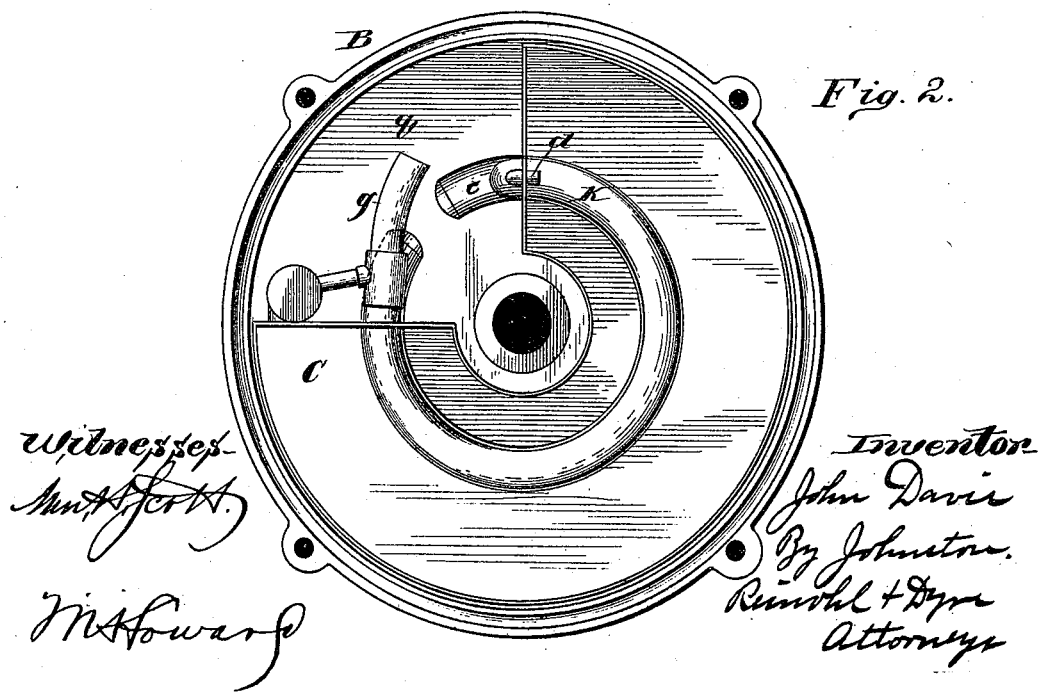

In the accompanying drawings, which form part of this specification, Figure 1 represents a top or plan view; Fig. 2, an inverted plan view of the cover detached, and Fig. 3 a vertical section.

Reference being had to the drawings and the letters thereon, A indicates the body of the filter; B, the detachable cover; C, the chemical-chamber secured to the cover; D, the supply-pipe; E, the discharge-pipe for filtered water; F, the discharge-pipe for muddy water in cleansing the filter-bed; G, the agitator-shaft, and H its blades or vanes. The top or cover B and the base I are secured in position by bolts $a$ and nuts $b$, which pass through and bear upon said parts, respectively.

The supply-pipe D communicates with a circulating-pipe, K, which is housed in a groove, $c$, in the cover B, and communicates with the chemical-chamber C through a branch, $d$, for supplying water to the chemicals therein contained. The water, charged with the chemicals to produce coagulation, flows from the chamber C into the circulating-pipe through valve $e$ and branch $f$, and is discharged through the exit-pipe $g$ into the filter above the bed $h$, which may be of any suitable material used for filtering purposes.

The chemical-chamber is supplied with chemicals through the aperture $i$, and the quantity of chemicals admitted to the water to cause the impurities to coagulate is regulated by the cock or valve $e$.

The filter-bed $h$ rests upon a bottom, $k$, composed of two layers or thicknesses of wire, and below said bottom is a chamber, $l$, for filtered water, with which the pipe E communicates. The pipe E is provided with a detachable discharge-nozzle, L, and an external screw-thread, $m$, for attaching a section of hose for supplying water under the filter-bed when it is desired to cleanse it. In cleansing the bed the agitator is revolved, the bed raised in columns by the vanes H, and the water forced through the passages formed by the vanes and the muddy water discharged through the screen $n$ and pipe F.

The agitator-shaft is mounted upon a step or pintle, $o$, and is operated by a lever or handle, $p$. By this construction the chemical-chamber, the filter-bed, and the space above the filter-bed (which forms a coagulating-chamber, $q$) are brought very close together, and the whole encompassed in a small space, thus adapting the filter for use for household and other purposes where a limited supply is required.

The operation of filtering liquids by my improved device is obvious and need not, therefore, be further elucidated.

The agitator shown is claimed in my application Serial No. 266,845; and in application Serial No. 291,377 I have claimed a coagulating and precipitating chamber, a chemical-chamber, and suitable connections for supplying and charging water with chemicals and for discharging purified water.

Having thus fully described my invention, what I claim is—

1. In a filter, the combination of a chemical-chamber at the upper end thereof, a supply-pipe, a circulating-pipe communicating with said chamber and discharging into the filter, a filter-bed below the chemical-chamber, and a coagulating-chamber between the cover of the filter and the filter-bed, and all of said parts being within the filter-vessel, substantially as described.

2. In a filter, a chemical-chamber supported by the cover of the filter, a supply-pipe, a circulating-pipe provided with branches and communicating with said chamber, and a valve for controlling the supply of chemicals to the water, in combination with a filter-bed below the chemical-chamber, and a coagulating-chamber between the chemical-chamber and the filter-bed, and all of said parts being within the filter-vessel, substantially as described.

In testimony whereof I affix my signature in presence of two witnesses.

JOHN DAVIS.

Witnesses:
S. A. TERRY,
WM. E. DYRE.